United States Patent Office 3,057,741
Patented Oct. 9, 1962

3,057,741
METHOD OF MAKING CERAMOPLASTIC
MATERIAL
Robert E. Moore, Rolla, Mo., assignor to Mycalex Corporation of America, Clifton, N.J., a corporation of New York
No Drawing. Filed Sept. 15, 1959, Ser. No. 839,992
22 Claims. (Cl. 106—39)

This invention relates to a new and improved method of making vitreo-micaceous materials and particularly to a new and improved method for making ceramoplastic materials such as, for instance, synthetic mica bonded with glass.

With the discovery of practical methods of manufacturing synthetic mica, new and improved vitreo-micaceous materials have been developed which incorporate synthetic mica therein. Many of the new ceramoplastic materials are made of synthetic fluor-phlogopite mica bonded with glass, the glass preferably being a low melting glass such as, for instance, lead borate, lead borosilicate, barium borate or barium borosilicate. The usual method now used for manufacturing ceramoplastic of the type mentioned hereinbefore is to powder synthetic fluor-phlogopite mica and mix it with powdered frit, thereafter heating the mixture to a temperature for softening the frit and thereafter introducing the heated mixture into a mold and pressing said material while the material cools. Such a ceramoplastic material has superior electrical and mechanical properties which have made it unique in the electrical and thermal insulating fields.

Although the method hereinbefore briefly described yields an excellent ceramoplastic insulating material, I have found that a more homogeneous material having more uniform crystals of mica dispersed therethroughout can be provided by the method embodying the present invention. By providing a ceramoplastic with a more homogeneous distribution of the mica in the glass binder and a more uniform and controlled mica crystal size, the control of the quality of the material may be more precise and the electrical and mechanical properties thereof may also be markedly improved.

The present invention is a continuation-in-part of two earlier patent applications, Serial Nos. 681,430 and 681,433, filed by me September 3, 1957, and now abandoned. Additionally, the present method of manufacturing ceramoplastic material is based on recent discoveries of mine contained in a copending patent application, Serial No. 840,030, filed by me concurrently herewith. There is described in said copending application a method of making synthetic non-hydroxyl mica such as normal fluor-phlogopite mica. In one form of said method, raw batch materials, stoichiometrically proportioned and chemically combinable for making said normal fluor-phlogopite mica, are dissolved in a molten lead borate. Thereafter, the resulting solution is cooled to permit said synthetic mica to crystallize out of the solution. Alternatively, synthetic mica crystals can be made by dissolving powdered synthetic mica crystals, such as synthetic normal fluor-phlogopite mica, in lead borate glass frit, and then cooling the resulting solution to recrystallize synthetic mica crystals therefrom.

The main object of the present invention is the provision of an improved method of making ceramoplastic materials.

Another object of the present invention is the provision of a method of making improved ceramoplastic materials.

The above and other objects, characteristics and features of the present invention will be more fully understood from the following detailed description.

As stated hereinbefore, the invention forming the subject matter of the present application stems from the invention described and claimed in my aforesaid copending application filed of even date. Broadly, that invention involves making synthetic mica and provides for the mixing of finely powdered raw materials which together have the proper stoichiometric proportions of non-hydroxyl mica, such as normal fluor-phlogopite mica, with finely powdered lead borate frit. Alternatively, powdered non-hydroxyl mica, such as said normal fluor-phlogopite mica can be mixed with said lead borate frit. The frit may be manufactured by conventional fritting methods and may be composed essentially of from 50% to 92% lead oxide (PbO) and from 50% to 8% boron trioxide ($B_2O_3$). However, preferably, the frit is composed essentially of 81.4% PbO and 18.6% $B_2O_3$.

The present invention is more particularly concerned with making ceramoplastic materials as beforementioned, and since the invention of the copending application is involved herein the term "mica forming material" will be used herein broadly to mean raw batch materials which are stoichiometrically equivalent to and chemically combinable to form the desired non-hydroxyl mica and said non-hydroxyl mica itself.

An example of one satisfactory group of raw batch materials which provide ions in proper stoichiometric proportions to yield normal fluor-phlogopite mica ($KMg_3AlSi_3O_{10}F_2$) is presented below:

| | Percent |
|---|---|
| Potassium silico fluoride ($K_2SiF_6$) | 19.77 |
| Potash feldspar ($KAlSi_3O_8$) | 18.47 |
| Silica ($SiO_2$) | 24.26 |
| Alumina ($Al_2O_3$) | 8.95 |
| Magnesia ($MgO$) | 28.55 |

Other combinations of raw materials forming a batch for making normal fluor-phlogopite mica may be readily worked out by anyone skilled in the art. Moreover, raw material batches for other types of non-hydroxyl micas may also be computed to yield a mica batch of proper stoichiometric proportions. Alternatively, anyone of a number of synthetic non-hydroxyl micas can be used in making ceramoplastic material, as beforementioned.

After the frit and the mica forming material are mixed together, preferably in finely powdered form, they are heated as in an oven to a temperature preferably between 800° C. and 1,200° C. The ratio of the amount of the mica forming material to the amount of frit depends upon the temperature to which the mixture is heated. This stems from the fact that lead borate will dissolve larger quantities of the mica forming material at higher temperatures. For instance, if the mixture is heated to 800° C., the lead borate will dissolve only about 10% by weight of the normal fluor-phlogopite mica forming material. At 1,000° C. the lead borate will dissolve about 20% by weight of the mica forming material and at 1,200° C. the lead borate will dissolve about 30% by weight of the mica forming material. At 1365° C., as much mica as desired may be introduced into solution as the mica is molten at that temperature. I prefer to heat the mixture to about 1,050° C., at which temperature the lead borate will dissolve about 22% by weight of the mica forming material. Above 1,050° C. the lead in the frit tends to volatilize and this creates a substantial health hazard. Accordingly, from practical commercial considerations it is inadvisable to heat the mixture of the mica forming material and frit to temperatures above 1,050° C.

Preferably the ratio of the amount of the mica forming material to the amount of lead borate frit is precisely that which will result in a saturated solution at the temperature to which the mixture is going to be heated. When the mixture is brought to the desired temperature such as, preferably, 1,050° C., it is maintained at said temperature until all of the mica forming material has been dissolved in the lead borate. A determination of complete dissolution of the mica forming material may be made by removing a small portion of the solution and quenching it. Thereafter, microscopic examination of the quenched material will indicate whether any of the batch materials are present as crystals or whether any mica particles are present as mica particles. If there are batch particles or mica particles present then complete dissolution of the mica forming material has not been achieved. If no batch or mica particles are present in the quenched material, then complete dissolution of the mica forming material has been achieved.

After the mixture has been held at the desired temperature for sufficient time to achieve complete dissolution, the solution is gradually cooled. As the solution cools, it becomes less able to hold the dissociated ions which are combinable to form mica and precipitation occurs. The cooling may preferably first proceed relatively rapidly down to about 800° C. in order to make the solution quite viscous and this retards the tendency of the mica crystals to float to the top of the much denser liquid mass. At 800° C. or perhaps even lower, the solution is sufficiently viscous to substantially retard this movement. However, undue viscosity retards crystal growth. Accordingly, a balance must be made between settling and crystal growth. After sufficient viscosity has been achieved the liquid is slowly cooled to permit the growth of crystals to desired size.

When finally cooled to room temperature, the solid mass may be removed from its container or crucible and ground to a powder, preferably to about 100 mesh. Thereafter, a small amount of water, not more than about 10% by weight, is added to the powder to act as a temporary binder and preforms are made. If compression molding techniques are employed, then the preform mixture will substantially be formed to the shape into which it will finally be molded. Thereafter, the preform is preheated to a temperature somewhere between 1,250° F. and 1,500° F. and the preheated preform is then placed in a mold which has been preheated to a temperature between 550° F. and 700° F. The preferable preheat temperature for the preform will be about 1,350° F. and the preferable temperature of the mold will be about 600° F. The mold is then closed and the preheated preform is subjected to a pressure of about two tons per square inch. Thereafter, the molded article may, if desired, be transferred to an annealing furnace in which it is permitted to be gradually cooled to room temperature. After cooling, if desired, the surface of the molded product may be ground or otherwise treated to smooth it. The final ceramoplastic will have an excellent dispersion of uniform crystals of mica throughout the glassy matrix, which dispersion cannot possibly be achieved by the former method of mechanically mixing mica and glass frit. This dispersion and uniformity of size of the mica results in uniformity of properties and an improvement in physical, chemical and electrical properties.

In the event that injection molding techniques are to be employed, the mass of crystallized mica and glass are ground to a powder, preferably sufficiently fine to pass through a 100 mesh sieve and the powdered material is mixed with a temporary binder, such as, for instance, water. Preferably, the temporary binder does not exceed 10% by weight of the powder. After the powder and the water have been thoroughly homogenized, the resulting mass is pressed into pellets or preforms which are proportioned for insertion into a mold by the action of a ram. Thereafter, the pellets or preforms are preheated to a temperature in the range of about 1,250° F. to 1,500° F. whereby to impart plasticity to the lead borate in the pellet. The pellets are then transferred to an injection molding machine and positioned so that the mold ram when brought home will subject the plastic mass to pressures sufficient to cause it to flow into a mold cavity which has been preheated to a temperature between 550° F. and 700° F. The pressures achieved by the action of the mold ram may vary from 10,000 to 50,00 pounds per square inch depending upon the intricacy of the shape to be molded. Preferably, the preheat temperature for the pellets or pills will be about 1,400° F. and the mold temperature will be about 600° F. After the ram has been driven home, it is held for a short time interval and then released. The molded article is ejected from the mold and will exhibit the superior properties already described above with regard to the compression molded product.

Generally, ceramoplastic materials preferably contain from 30% to 85% synthetic mica and from 70% to 15% glass. An excellent compression molded product can be made with 65% mica and 35% lead borate. An excellent composition for injection molded products is yielded by having about 38% mica and 62% lead borate. Accordingly, it may be desired to add to the ceramoplastic produced in accordance with this method prior to compression or injection molding additional natural or synthetic mica. Moreover, if desired, a small amount of mineralizer such as, for instance, cryolite, potassium aluminum fluoride ($K_3AlF_6$) or lead fluoride ($PbF_2$) may also be added prior to molding.

While the above specification describes a method of making ceramoplastic having synthetic normal fluor-phlogopite mica therein, the present method may be used with other raw batch materials for preparing other non-hydroxyl micas and other powdered non-hydroxyl micas such as, for instance, fluor-micas. Specifically, the present invention may be employed with other fluor-phlogopite micas such as, for instance, lithium tetrasilicic fluor-phlogopite mica ($KMg_2LiSi_4O_{10}F_2$) and barium di-silicic fluor-phlogopite mica ($BaMg_3Al_2Si_2O_{10}F_2$).

While I have herein shown and described several forms of the present invention, various changes and modifications may be made therein within the scope of the appended claims without departing from the spirit and scope of this invention.

What I claim is:

1. A method of making a ceramoplastic material comprising the steps of dissolving at least about 10% by weight of non-hydroxyl mica forming material in a lead borate glass heated to between 800° C. and 1200° C., cooling the resulting solution at a rate to cause said non-hydroxyl mica to precipitate therefrom and then to cause solidification of said glass with a dispersion of said precipitated mica therein, and then molding at least a portion of said solidified material under heat and pressure.

2. A method of making a ceramoplastic material comprising the steps of dissolving at least 10% by weight of non-hydroxyl mica forming material in a lead borate glass heated to between 800° C. and 1200° C., cooling the resulting solution at a rate to precipitate said non-hydroxyl mica therefrom and then to solidify said glass solution with a dispersion of said precipitated mica therein, grinding said solidified material, and then molding at least a portion of said ground material under heat and pressure.

3. A method of making ceramoplastic material comprising the steps of heating lead borate glass to between about 800° C. and 1,200° C., dissolving at least 10% by weight of non-hydroxyl mica in said heated lead borate, cooling the solution at such a rate as to cause the mica to precipitate out and to then cause the lead borate to become a solid mass with the precipitated mica dispersed therethroughout, grinding said mass, and then molding at least a portion of said ground mass under heat and pressure.

4. A method of making ceramoplastic material comprising the steps of heating lead borate glass to between about 800° C. and 1,200° C., dissolving at least 10% by weight of non-hydroxyl fluor-mica in said heated lead borate, cooling the solution at such a rate as to cause the mica to precipitate out and to then cause the lead borate to become a solid mass with the precipitated mica dispersed therethroughout, grinding said mass and then molding at least a portion of said ground mass under heat and pressure.

5. A method of making ceramoplastic material comprising the steps of heating lead borate glass to between about 800° C. and 1,200° C., dissolving at least 10% by weight of fluor-phlogopite mica in said heated lead borate, cooling the solution at such a rate as to cause the mica to precipitate out and to then cause the lead borate to become a solid mass with the precipitated mica dispersed therethroughout, grinding said mass, and then molding at least a portion of said ground mass under heat and pressure.

6. A method of making ceramoplastic material comprising the steps of heating lead borate glass to between about 800° C. and 1,200° C., dissolving at least 10% by weight of normal fluor-phlogopite mica in said heated lead borate, cooling the solution at such a rate as to cause the mica to precipitate out and to then cause the lead borate to become a solid mass with the precipitated mica dispersed therethroughout, grinding said mass, and then molding at least a portion of said ground mass under heat and pressure.

7. A method of making ceramoplastic material comprising the steps of heating lead borate glass to about 1,050° C., dissolving about 22% by weight of non-hydroxyl mica in said heated lead borate, cooling the solution at such a rate as to cause the mica to precipitate out and to then cause the lead borate to become a solid mass with the precipitated mica dispered therethroughout grinding said mass, and then molding at least a portion of said ground mass under heat and pressure.

8. A method of making ceramoplastic material comprising the steps of heating lead borate to about 1,050° C., dissolving about 22% by weight of normal fluor-phlogopite mica in said heated lead borate, cooling the solution at such a rate as to cause the mica to precipiate out and to then cause the lead borate to become a solid mass with the precipitated mica dispersed therethroughout, grinding said mass, and then molding at least a portion of said ground mass under heat and pressure.

9. A method of making ceramoplastic material comprising the steps of heating lead borate consisting essentially of about 50% to 92% lead oxide and 50% to 8% boron oxide to a temperature of between about 800° C. and 1,200° C., dissolving at least 10% by weight of non-hydroxyl mica in said heated lead borate, cooling the solution at such a rate as to cause the mica to precipitate out and to then cause the lead borate to become a solid mass with the precipitated mica dispersed therethroughout, grinding said mass, and then molding at least a portion of said ground mass under heat and pressure.

10. A method of making ceramoplastic material comprising the steps of heating lead borate consisting essentially of about 50% to 92% lead oxide and 50% to 8% boron oxide to a temperature of between about 800° C. and 1,200° C., dissolving at least 10% by weight of non-hydroxy fluor-phlogopite mica in said heated lead borate, cooling the solution to cause the mica to precipitate out and to then cause the lead borate to become a solid mass with the precipitated mica dispersed therethroughout, grinding said mass, and then molding at least a portion of said ground mass under heat and pressure.

11. A method of making ceramoplastic material comprising the steps of heating lead borate consisting essentially of about 81.4% lead oxide and 18.6% boron oxide to a temperature of about 1,050° C., dissolving about 22% by weight of normal fluor-phlogopite mica in said heated lead borate, cooling the solution at such a rate as to cause the mica to precipitate out and to then cause the lead borate to become a solid mass with the precipitated mica dispered therethroughout, grinding said mass, and then molding at least a portion of said ground mass under heat and pressure.

12. A method of making ceramoplastic material comprising the steps of dissolving at least 10% by weight of raw materials which contain the ionic constitutents of non-hydroxyl mica in substantially correct stoichiometric proportions in lead borate glass heated to a temperature between about 800° C. and 1,200° C., cooling said solution at a rate to cause the mica to precipitate out and to then cause said glass to become a solid mass with the precipitated mica dispersed therethroughout, grinding said mass, and then molding at least a portion of said ground mass under heat and pressure.

13. A method of making ceramoplastic material comprising the steps of dissolving at least 10% by weight of raw materials which contain the ionic constituents of fluor-mica in substantially stoichiometric proportions in lead borate glass heated to a temperature between about 800° C. and 1,200° C., cooling said solution at a rate to cause the mica to precipitate out and to then cause said glass to become a solid mass with the precipitated mica dispersed therethroughout, grinding said mass, and then molding at least a portion of said ground mass under heat and pressure.

14. A method of making ceramoplastic material comprising the steps of dissolving at least 10% by weight of raw materials which contain the ionic constituents of normal fluor-phlogopite mica in substantially correct stoichiometric proportions in lead borate glass heated to a temperature between about 800° C. and 1,200° C., cooling said solution to a rate to cause the mica to precipitate out and to then cause said glass to become a solid mass with the precipitated mica dispersed therethroughout, grinding said mass, and then molding at least a portion of said ground mass under heat and pressure.

15. A method of making ceramoplastic material comprising the steps of dissolving about 22% by weight of raw materials which contain the ionic constituents of non-hydroxyl mica in substantially correct stoichiometric proportions in lead borate glass heated to a temperature of about 1,050° C., cooling said solution at a rate to cause the mica to precipitate out and to then cause said glass to become a solid mass with the precipitated mica dispersed therethroughout, grinding said mass, and then molding at least a portion of said ground mass under heat and pressure.

16. A method of making ceramoplastic material comprising the steps of dissolving about 22% by weight of raw materials which contain the ionic constituents of normal fluor-phlogopite mica in substantially correct stoichiometric proportions in lead borate glass heated to a temperature of about 1,050° C., cooling said solution at a rate to cause the mica to precipitate out and to then cause said glass to become a solid mass with the precipitated mica dispersed therethroughout, grinding said mass, and then molding at least a portion of said ground mass under heat and pressure.

17. A method of making ceramoplastic material comprising the steps of heating lead borate glass consisting essentially of about 50% to 92% lead oxide and about 50% to 8% boron oxide to a temperature between about 800° C. and 1,200° C., dissolving in said heated lead borate at least 10% by weight of raw materials which contain the ionic constituents of non-hydroxyl mica in substantially correct stoichiometric proportions, cooling said solution at a rate to cause the mica to precipitate out and to then cause said glass to become a solid mass with the precipitated mica dispersed therethroughout, grinding said mass, and then molding at least a portion of said ground mass under heat and pressure.

18. A method of making ceramoplastic material comprising the steps of heating lead borate glass consisting essentially of about 81.4% lead oxide and about 18.6% boron oxide to a temperature of about 1,050° C., dissolving in said heated lead borate glass about 22% by weight of raw materials which contain the ionic constituents of non-hydroxyl mica in substantially correct stoichiometric proportions, cooling said solution at a rate to cause the mica to precipitate out and to then cause said glass to become a solid mass with the precipitated mica dispersed therethroughout, grinding said mass, and then molding at least a portion of said ground mass under heat and pressure.

19. A method of making ceramoplastic material comprising the steps of heating lead borate glass consisting essentially of about 81.4% lead oxide and about 18.6% boron oxide to a temperature of about 1,050° C., adding to said lead borate glass at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead borate, cooling said solution at a rate to cause the mica to precipitate out and to then cause said glass to become a solid mass with the precipitated mica dispersed therethroughout, grinding said mass, and then molding at least a portion of said ground mass under heat and pressure.

20. A method of making ceramoplastic material comprising the steps of heating lead borate glass consisting essentially of about 81.4% lead oxide and about 18.6% boron oxide to a temperature of about 1,050° C., adding to said lead borate glass at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead borate, cooling said solution at a rate to cause mica to precipitate out and to then cause said glass to become a solid mass with the precipitated mica dispersed therethroughout, grinding said mass, mixing temporary binder into said ground mass, then pressing said mixture into preforms, then preheating said preforms to a temperature between about 1,250° F. and 1,500° F., then placing said preheated preform into a mold preheated to a temperature between about 550° F. and 700° F., and subjecting said preform to a pressure of about 2 tons per square inch.

21. A method of making ceramoplastic material comprising the steps of heating lead borate glass consisting essentially of about 81.4% lead oxide and about 18.6% boron oxide to a temperature of about 1,050° C., adding to said lead borate glass at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead borate, cooling said solution at a rate to cause mica to precipitate out and to then cause said glass to become a solid mass with the precipitated mica dispersed therethroughout, grinding said mass, mixing temporary binder into said ground mass, then pressing said mixture into preforms, then preheating said preforms to a temperature between about 1,250° F. and 1,500° F., then by injection molding forcing said preheated material into a mold preheated to a temperature between about 550° F. and 700° F., and subjecting said material in said mold to a pressure of between about 10,000 and 50,000 pounds per square inch.

22. A method of making ceramoplastic material comprising the steps of heating lead borate glass consisting essentially of about 81.4% lead oxide and about 18.6% boron oxide to a temperature of about 1,050° C., adding to said lead borate glass at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead borate, cooling said solution at a rate to cause said mica to precipitate out and to then cause said glass to become a solid mass with the precipitated mica dispersed therethroughout, grinding said mass, mixing additional ground crystalline mica with said ground mass, and then molding at least a portion of said resultant mixture under heat and pressure.

References Cited in the file of this patent

UNITED STATES PATENTS

| | | |
|---|---|---|
| Re. 15,727 | Crossley | Dec. 4, 1923 |
| 1,795,200 | Crossley | Mar. 3, 1931 |
| 2,136,877 | Delpech et al. | Nov. 15, 1938 |
| 2,558,878 | Richardson | July 3, 1951 |
| 2,669,764 | Kilpatrick | Feb. 23, 1954 |

FOREIGN PATENTS

| | | |
|---|---|---|
| 569,222 | Great Britain | May 14, 1945 |
| 1,121,798 | France | May 7, 1956 |

OTHER REFERENCES

Bureau of Mines Report (pages 1 and 2), August 1951, "Information About Synthetic Mica."

Lange: "Handbook of Chemistry," 9th Ed. publ. 1956, Sandusky, Ohio (page 178).